US011216714B2

(12) United States Patent
Rogers et al.

(10) Patent No.: US 11,216,714 B2
(45) Date of Patent: Jan. 4, 2022

(54) ELECTRONICALLY SCANNABLE DEVICE FOR RADIO-FREQUENCY IDENTIFICATION

(71) Applicant: The Boeing Company, Chicago, IL (US)

(72) Inventors: John E. Rogers, Owens Cross Roads, AL (US); Robert A. Smith, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/732,458

(22) Filed: Jan. 2, 2020

(65) Prior Publication Data

US 2021/0209439 A1 Jul. 8, 2021

(51) Int. Cl.
  *G06K 19/077* (2006.01)
  *G06K 19/07* (2006.01)
  *B64F 5/40* (2017.01)

(52) U.S. Cl.
  CPC ... *G06K 19/07794* (2013.01); *G06K 19/0723* (2013.01); *B64F 5/40* (2017.01)

(58) Field of Classification Search
  USPC ........................................................ 235/494
  See application file for complete search history.

(56) References Cited

U.S. PATENT DOCUMENTS

| | | | | |
|---|---|---|---|---|
| 7,376,583 | B1* | 5/2008 | Rolf | G06Q 20/10 705/17 |
| 10,812,125 | B1* | 10/2020 | Badic | H04B 7/0814 |
| 10,819,386 | B1* | 10/2020 | Barnawi | H04L 27/103 |
| 2005/0206555 | A1* | 9/2005 | Bridgelall | G01S 13/878 342/127 |
| 2010/0039228 | A1* | 2/2010 | Sadr | G06K 7/10366 340/10.1 |
| 2012/0146767 | A1* | 6/2012 | Holly | G06K 19/0723 340/10.1 |
| 2017/0090031 | A1* | 3/2017 | Bondy | G01S 7/4911 |

(Continued)

OTHER PUBLICATIONS

Schwerdt, "A Fully Passive Wireless Microsystem for Recording of Neuropotentials Using RF Backscattering Methods", (2011), Journal of Microelectrical Systems, vol. 20, pp. 1119-1130.

(Continued)

*Primary Examiner* — Allyson N Trail
(74) *Attorney, Agent, or Firm* — Yee & Associates, P.C.

(57) ABSTRACT

A method and apparatus for identifying a location of a radio-frequency identification tag. A hand-held locator device is configured to transmit a first signal and a second signal. A frequency of the first signal changes through a first range of frequencies and is transmitted in a range of directions corresponding to the first range of frequencies. A frequency of the second signal changes through a second range of frequencies and is transmitted in the range of directions corresponding to the second range of frequencies. A difference frequency signal, having a frequency that is a difference between the frequency of the first signal and the frequency of the second signal, is received from the radio-frequency identification tag. The difference frequency signal is processed to determine and display a direction of the radio-frequency identification tag from the locator device.

24 Claims, 5 Drawing Sheets

(56) References Cited

U.S. PATENT DOCUMENTS

| | | | | |
|---|---|---|---|---|
| 2018/0024176 | A1* | 1/2018 | Meliani | G01N 22/00 |
| | | | | 324/629 |
| 2018/0288677 | A1* | 10/2018 | Jain | H04N 21/00 |
| 2018/0372861 | A1* | 12/2018 | Degani | G01S 13/886 |
| 2019/0056478 | A1* | 2/2019 | Millar | H04B 1/69 |
| 2019/0064358 | A1* | 2/2019 | Desai | G01S 7/4815 |
| 2019/0356174 | A1* | 11/2019 | Shen | H01M 10/44 |
| 2020/0011959 | A1* | 1/2020 | Abou-Rizk | G01S 5/14 |
| 2020/0028722 | A1* | 1/2020 | Chandrashekar | H04L 27/18 |
| 2020/0200898 | A1* | 6/2020 | Hustava | G01S 15/10 |

OTHER PUBLICATIONS

Bito, "Ambient RF Energy Harvesting from a Two-Way Talk Radio for Flexible Wearable Wireless Sensor Devices Utilizing Inkjet Printing Technologies", (2015), IEEE Transactions on Microwave Theory and Techniques, vol. 63, pp. 4533-4543.

Abad, "Flexible Tag Microlab Development: Gas Sensors Integration in RFID Flexible Tags for Food Logistic", (2007), Elsevier B.V., DOI: 10.1016.

Fonseca, "Flexible Wireless Passive Pressure Sensors for Biomedical Applications", (2006), Solid-State Sensors, Actuators, and Microsystems Workshop, Hilton Head Island, South Carolina, pp. 37-42.

Xu, "Passive and Wireless near Field Communication Tag Sensors for Biochemical Sensing with Smartphone", (2016), Elsevier B.V., DOI: 10.1016.

Escobedo, et al.; "Flexible passive near field communication tag for multigas sensing;" Analytical Chemistry; 2017 39; pp. 1697-1703.

Rida; "Conductive Inkjet Printed Antennas on Flexible Low-Cost Paper-Based Substrates for RFID and WSN Applications;" Thesis; Georgia Institute of Technology; May 2009; 62 pages.

Rose, et al.; "Adhesive RFID Sensor Patch for Monitoring of Sweat Electrolytes;" IEEE Transactions on Biomedical Engineering; ID No. TBME-00773-2014-R1; Jun. 2015; 9 pages.

* cited by examiner

ELECTRONICALLY SCANNABLE DEVICE FOR RADIO-FREQUENCY IDENTIFICATION

BACKGROUND INFORMATION

1. Field

The present disclosure relates generally to systems and methods for using radio-frequency identification tags. More particularly, the present disclosure relates to a system and method for detecting and locating radio-frequency identification tags.

2. Background

The manufacturing and maintenance of aircraft requires the use of various tools and other objects. Tools and other objects that are unintentionally left on an aircraft after manufacturing and maintenance operations are performed may be referred to as foreign object debris, FOD. The presence of such foreign object debris on an aircraft may have undesirable consequences. For example, foreign object debris on an aircraft may injure personnel on the aircraft during aircraft operations. Foreign object debris also may damage the aircraft.

To avoid such undesirable consequences, technicians take care to make sure that any tools or other objects used during manufacturing or maintenance of an aircraft are removed from the aircraft when manufacturing and maintenance operations on the aircraft are finished. Technicians will often perform a careful visual inspection of the aircraft to make sure that no tools or other objects are left behind. Such a careful visual inspection may be time consuming. Furthermore, visual inspection of the aircraft relies on human perception, which is not perfect, and may result in tools or other objects on the aircraft being missed.

Automated systems are used to detect foreign object debris on airport runways. For example, high resolution cameras and millimeter wave radar sensors are used to detect foreign object debris left on runways during aircraft landing and takeoff. However, no such automated technology is currently available for detecting foreign object debris within an aircraft.

Therefore, there may be a need for a method and apparatus that take into account at least some of the issues discussed above, as well as other possible issues.

SUMMARY

Illustrative examples provide a method of identifying a location of a radio-frequency identification tag. A first signal and a second signal are transmitted. A frequency of the first signal changes through a first range of frequencies and is transmitted in a range of directions corresponding to the first range of frequencies. The second signal is transmitted along with the first signal. A frequency of the second signal changes through a second range of frequencies and is transmitted in the range of directions corresponding to the second range of frequencies. A difference frequency signal is received from the radio-frequency identification tag. The difference frequency signal is indicative of a difference between the frequency of the first signal and the frequency of the second signal. In one example, the frequency of the difference frequency signal is the difference between the frequency of the first signal and the frequency of the second signal. The difference frequency signal is processed to determine a direction of the radio-frequency identification tag. An indication of the direction of the radio-frequency identification tag is displayed.

Illustrative examples also provide an apparatus comprising at least one transmitter, a receiver, a processor, and a display. The at least one transmitter is configured to transmit a first signal. The frequency of the first signal changes through a first range of frequencies. The at least one transmitter is configured to transmit the first signal in a range of directions corresponding to the first range of frequencies. The at least one transmitter is configured also to transmit a second signal along with the first signal. A frequency of the second signal changes through a second range of frequencies. The at least one transmitter is configured to transmit the second signal in the range of directions corresponding to the second range of frequencies. The receiver is configured to receive a difference frequency signal from a radio-frequency identification tag. A frequency of the difference frequency signal is a difference between the frequency of the first signal and the frequency of the second signal. The processor is configured to process the difference frequency signal to determine a direction of the radio-frequency identification tag. The display is configured to display an indication of the direction of the radio-frequency identification tag.

Illustrative examples also provide a method including receiving a first signal having a first frequency and a second signal having a second frequency by a radio-frequency identification tag. A difference frequency signal is generated from the first signal and the second signal by the radio-frequency identification tag. The difference frequency signal is indicative of a difference between the first frequency of the first signal and the second frequency of the second signal. The difference frequency signal being at a third frequency. The difference frequency signal is transmitted by the radio-frequency identification tag.

Illustrative examples also provide a radio-frequency identification tag comprising a radio-frequency identification tag receiver, a difference frequency signal generator, and a radio-frequency identification tag transmitter. The radio-frequency identification tag receiver is configured to receive a first signal at a first frequency and a second signal at a second frequency. The difference frequency signal generator is configured to generate a difference frequency signal from the first signal and the second signal. The difference frequency signal is indicative of a difference between the first frequency of the first signal and the second frequency of the second signal. The radio-frequency identification tag transmitter is configured to transmit the difference frequency signal.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives, and features thereof, will best be understood by reference to the following detailed description of an illustrative example of the present disclosure when read in conjunction with the accompanying drawings, wherein:

DETAILED DESCRIPTION

The illustrative examples recognize and take into account different considerations. For example, the illustrative examples recognize and take into account that it is desirable make sure that there are no tools or other objects left onboard an aircraft after manufacturing and maintenance operations are performed. Illustrative examples also recognize and take into account that manual methods for identifying such foreign object debris left behind on an aircraft by visual inspection are time consuming and subject to error. Illustrative examples further recognize and take into account that automated systems for detecting foreign object debris on airport runways are not useable for detection of foreign object debris within an aircraft.

Illustrative examples recognize and take into account that it would be desirable to have an automated device for detecting foreign object debris within an aircraft. Preferably, such a device would have relatively low size, weight, and power requirements. A hand-held device that may be used by a technician to search for and detect foreign object debris left on an aircraft after manufacturing or maintenance operations are performed on the aircraft is desirable.

Illustrative examples provide a hand-held locator device for electronically scanning an area for radio-frequency identification tags. The radio-frequency identification tags may be attached to tools or other objects. For example, without limitation, a radio-frequency identification tag locator in accordance with an illustrative example may be used to detect and locate radio-frequency identification tags attached to tools or other objects on an aircraft. Illustrative examples thus may be used to prevent such tools or other objects from being unintentionally left on an aircraft.

A radio-frequency identification tag locator device in accordance with an illustrative example includes two transmit antenna arrays with inherent frequency scanning ability. A receive antenna array is configured to detect a difference frequency signal. Electronics associated with the transmit and receive antenna arrays is configured to generate wideband frequency chirps for transmission by the transmit antenna arrays and to receive and process a difference frequency signal received from a radio-frequency identification tag via the receive antenna array. The frequency of the difference frequency signal is the difference between the frequencies of the signals transmitted by the two transmit antenna arrays. The difference frequency signal is generated and transmitted by the radio-frequency identification tag in response to receiving the signals transmitted by the transmit antenna arrays of the locator device. The received difference frequency signal is processed by the locator device to determine the location of the radio-frequency identification tag. An indication of the location of the radio-frequency identification tag may be displayed on the locator device.

Illustrative examples provide a relatively low size, weight, and power solution for detecting foreign object debris on an aircraft. A radio-frequency identification tag locator device in accordance with an illustrative example is able to discriminate against background clutter to independently detect and locate objects with radio-frequency identification tags attached thereto. Illustrative examples may be adapted to linearly polarized and circularly polarized antenna types.

Figure 1:
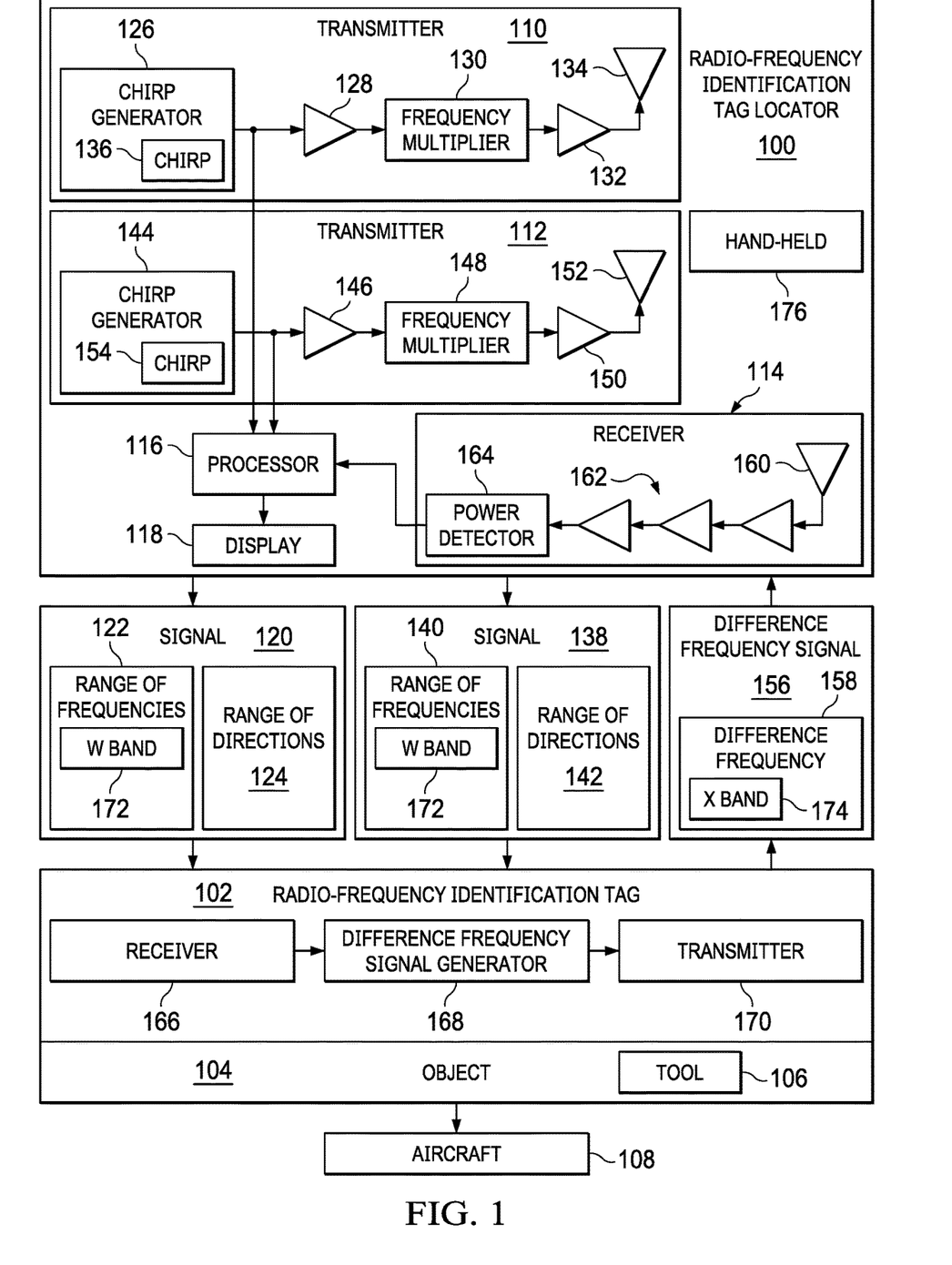
FIG. 1 is an illustration of a block diagram of a radio-frequency identification tag locator device in accordance with an illustrative example.

Turning to FIG. 1, an illustration of a block diagram of a radio-frequency identification tag locator device is depicted in accordance with an illustrative example. Radio-frequency identification tag locator 100 is configured to detect and locate radio-frequency identification tags, such as radio-frequency identification tag 102.

Radio-frequency identification tag 102 may be attached in any appropriate manner to any appropriate object 104. For example, without limitation, object 104 may include tool 106. Tool 106 may include any appropriate tool or other object that is used to perform manufacturing, maintenance, or other appropriate operations on aircraft 108 or for any other appropriate purpose.

Aircraft 108 may be any appropriate type of aircraft that may be configured to perform any appropriate operation or mission. For example, without limitation, aircraft 108 may be a commercial passenger aircraft, a cargo aircraft, a military aircraft, a personal aviation aircraft or any other appropriate type of aircraft. Aircraft 108 may be a fixed wing aircraft, a rotary wing aircraft, or a lighter-than-air aircraft. Aircraft 108 may be a manned aircraft or an unmanned aircraft.

Radio-frequency identification tag locator 100 may comprise transmitter 110, transmitter 112, receiver 114, processor 116, and display 118. Transmitter 110 may be referred to as a first transmitter. Transmitter 112 may be referred to as a second transmitter.

Transmitter 110 is configured to generate and transmit signal 120 from radio-frequency identification tag locator 100. Signal 120 may be referred to as a first signal. The frequency of signal 120 changes over range of frequencies 122. In other words, signal 120 may comprise a chirp. Range of frequencies 122 may be referred to as a first range of frequencies.

The direction at which signal 120 is transmitted from radio-frequency identification tag locator 100 changes as the frequency of signal 120 changes. Signal 120 is directed from radio-frequency identification tag locator 100 in range of directions 124 corresponding to range of frequencies 122.

Transmitter 110 may comprise chirp generator 126, amplifier 128, frequency multiplier 130, radio frequency, RF, amplifier 132, and transmit antenna array 134. Chirp generator 126 is configured to generate chirp 136. Chirp 136 preferably comprises a sweep of a wide band of frequencies. Amplifier 128 is configured to amplify chirp 136 generated by chirp generator 126. Frequency multiplier 130 up-converts the amplified chirp signals from amplifier 128 into radio frequency signals. Radio frequency amplifier 132 amplifies the radio frequency signals for transmission by transmit antenna array 134. Transmit antenna array 134 radiates signal 120 into free-space. Transmit antenna array 134 is configured to transmit different frequencies at different angles with respect to transmit antenna array 134.

Transmitter 112 is configured to generate and transmit signal 138 from radio-frequency identification tag locator 100. Signal 138 may be referred to as a second signal. The frequency of signal 138 changes over range of frequencies 140. In other words, signal 138 may comprise a chirp. Range of frequencies 140 may be referred to as a second range of frequencies. In one example, transmitter 110 and transmitter 112 may be combined into a single transmitter 110 capable of performing the functions of both transmitters 110 and 112.

The direction at which signal 138 is transmitted from radio-frequency identification tag locator 100 changes as the frequency of signal 138 changes. Signal 138 is directed from radio-frequency identification tag locator 100 in range of directions 142 corresponding to range of frequencies 140.

Signal 120 may be coordinated with signal 138 such that both signal 120 and signal 138 are transmitted in substantially the same direction at the same time. The frequencies of signal 120 and signal 138 are preferably coordinated such that the frequencies of signal 120 and signal 138 at any point in time are different from each other by a substantially constant difference frequency 158. In other words, at any point in time, signal 120 and signal 138 are transmitted in the same direction and have frequencies that are different from each other by difference frequency 158.

Transmitter 112 may comprise chirp generator 144 which generates chirp 154, amplifier 146, frequency multiplier 148, radio frequency amplifier 150, and transmit antenna array 152. Chirp generator 144, amplifier 146, frequency multiplier 148, radio frequency amplifier 150, and transmit antenna array 152 in transmitter 112 may operate in substantially the same way as chirp generator 126, amplifier 128, frequency multiplier 130, radio frequency amplifier 132, and transmit antenna array 134 in transmitter 110.

Receiver 114 is configured to receive difference frequency signal 156 from radio-frequency identification tag 102. The frequency of difference frequency signal 156 is difference frequency 158 between signal 120 and signal 138, which is transmitted back from radio-frequency identification tag 102.

Receiver 114 may comprise receive antenna array 160, amplifiers 162, and power detector 164. Amplifiers 162 may include any appropriate number of amplifiers for amplifying difference frequency signal 156 received by receive antenna array 160. Power detector 164 comprises a radio frequency power detector. For example, without limitation, power detector 164 may be configured to provide an output DC voltage signal that is linearly proportional to the input radio frequency power.

Processor 116 is configured to determine the direction of radio-frequency identification tag 102 from radio-frequency identification tag locator 100. Processor 116 may be configured to determine the direction of signals 120 and 138 at any time from, for example, the outputs of chirp generators 126 and 144. Processor 116 determines the direction of radio-frequency identification tag 102 as the direction of signals 120 and 138 at which the output of power detector 164 is the greatest. Processor 116 may be implemented in any appropriate manner.

The direction of radio-frequency identification tag 102 from radio-frequency identification tag locator 100, as determined by processor 116, may be displayed in any appropriate manner on display 118. Display 118 may be implemented using any appropriate display device.

Radio-frequency identification tag 102 may include receiver 166, difference frequency signal generator 168, and transmitter 170. Receiver 166 may be referred to as a radio-frequency identification tag receiver. Receiver 166 is configured to receive signal 120 and signal 138 from radio-frequency identification tag locator 100. Difference frequency signal generator 168 is configured to generate difference frequency signal 156 from received signal 120 and signal 138. Transmitter 170 may be referred to as a radio-frequency identification tag transmitter. Transmitter 170 is configured to transmit difference frequency signal 156 back to radio-frequency identification tag locator 100.

For example, without limitation, range of frequencies 122 of signal 120 and range of frequencies 140 of signal 138 may be in W band 172, from approximately 75 GHz to approximately 110 GHz. W band 172 may be referred to as a first frequency band. In this example, difference frequency 158 of difference frequency signal 156 may be in X band 174, from approximately 7 GHz to approximately 12 GHz. X band 174 may be referred to as a second frequency band. By transmitting at higher frequencies and receiving at a lower difference frequency, radio-frequency identification tag locator 100 may be able to operate at a larger range.

Radio-frequency identification tag locator 100 is preferably hand-held 176. For example, preferably the various components of radio-frequency identification tag locator 100 may be enclosed in a housing that is sized and shaped in an appropriate manner such that the device is easily held and operated in the hand of a human operator.

The illustration of radio-frequency identification tag locator 100 in FIG. 1 is not meant to imply physical or architectural limitations to the manner in which illustrative examples may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative example.

Figure 2:
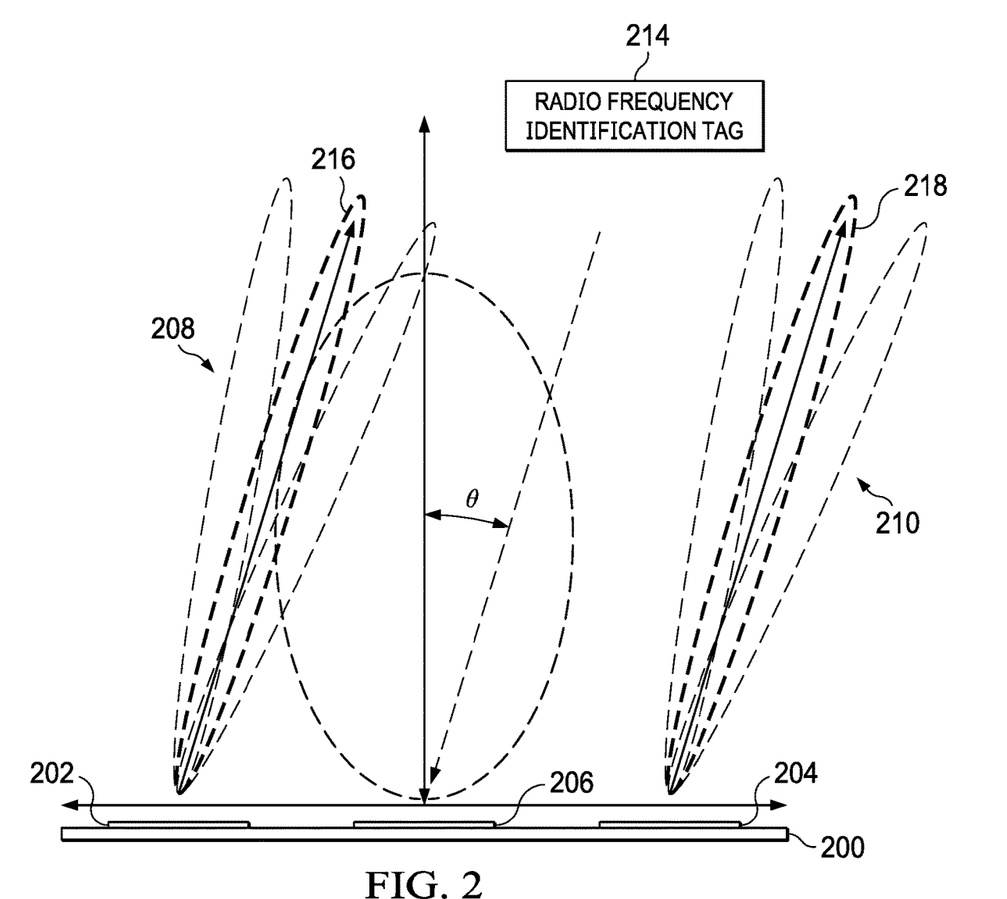
FIG. 2 is a schematic illustration of signals transmitted by a radio frequency identification tag locator in accordance with an illustrative example.

Turning to FIG. 2, a schematic illustration of signals transmitted by a radio frequency identification tag locator is depicted in accordance with an illustrative example. Radio-frequency identification tag locator 200 is an example of one implementation of radio-frequency identification tag locator 100 in FIG. 1.

Radio-frequency identification tag locator 200 comprises transmit antenna array 202, transmit antenna array 204, and receive antenna array 206. Transmit antenna array 202 transmits signal 208, which changes in frequency and direction. Transmit antenna array 204 transmits signal 210, which changes in frequency and direction. Receive antenna array 206 receives a difference frequency signal from radio-frequency identification tag 214 in response to signal 208 and signal 210.

The direction of radio-frequency identification tag 214 from device 200 thus may be determined from the difference frequency signal received by receive antenna array 206.

Figure 3:
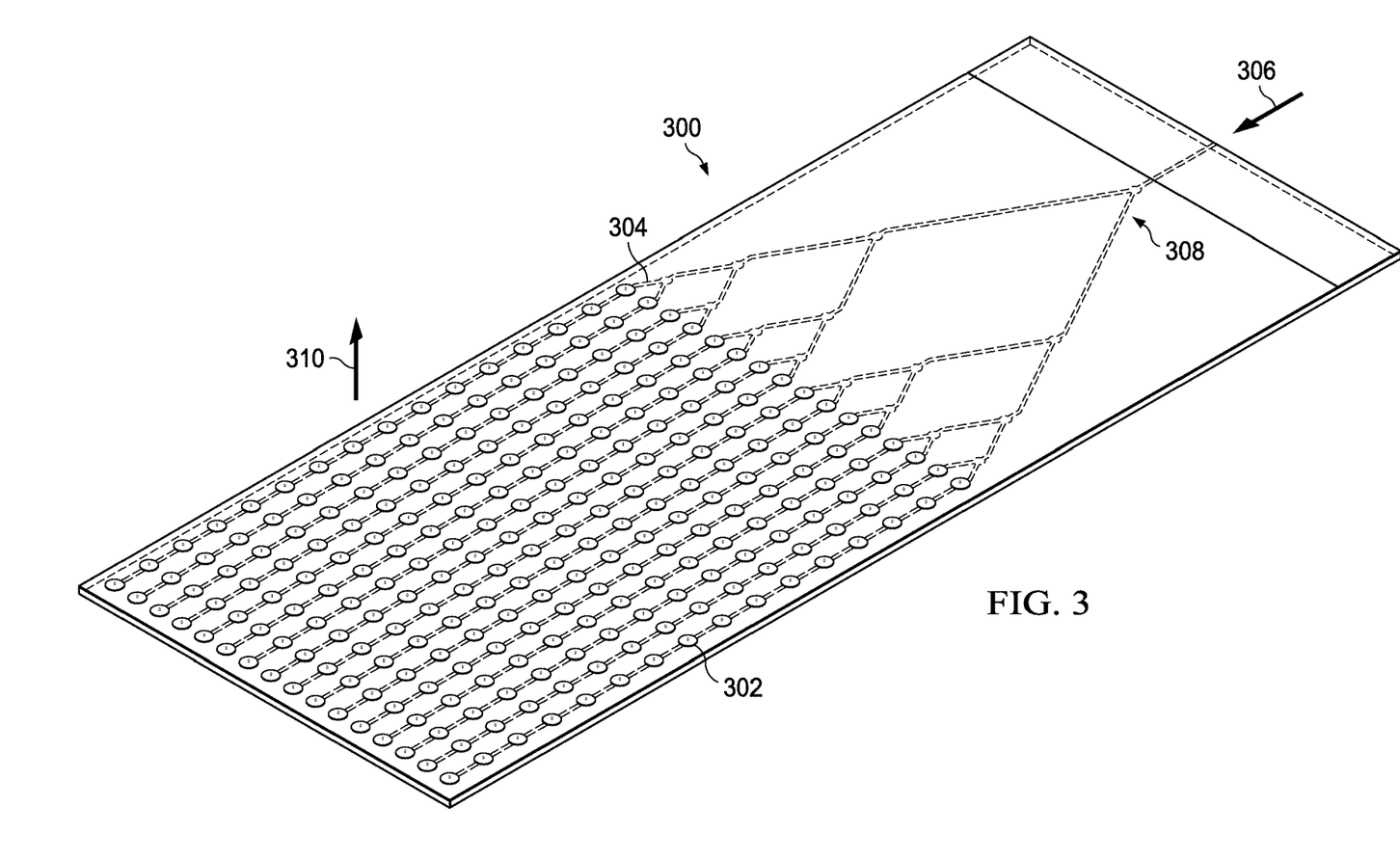
FIG. 3 is a plan view illustration of a transmit antenna array in accordance with an illustrative example.

Turning to FIG. 3, a plan view illustration of a transmit antenna array is depicted in accordance with an illustrative example. Transmit antenna array 300 is an example of one implementation of transmit antenna arrays 134 and 152 in radio-frequency identification tag locator 100 in FIG. 1.

In this example, transmit antenna array 300 is a serially fed W band antenna comprising a 16×16 array of proximity coupled antenna elements 302 with inclusive slots. An embedded microstrip feed network 304 comprises input 306 for receiving radio frequency power input and a 16×1 power divider 308 for delivering the radio frequency power to rows of antenna elements 302. A backside ground plane (not shown in FIG. 3) may be provided under the composite radio frequency board. The dimensions of antenna elements 302 with slots may be numerically determined to maximize signal propagation in the desired operating frequency band. In this example, the radio frequency signal is directed generally in the direction indicated by arrow 310.

Figure 4:
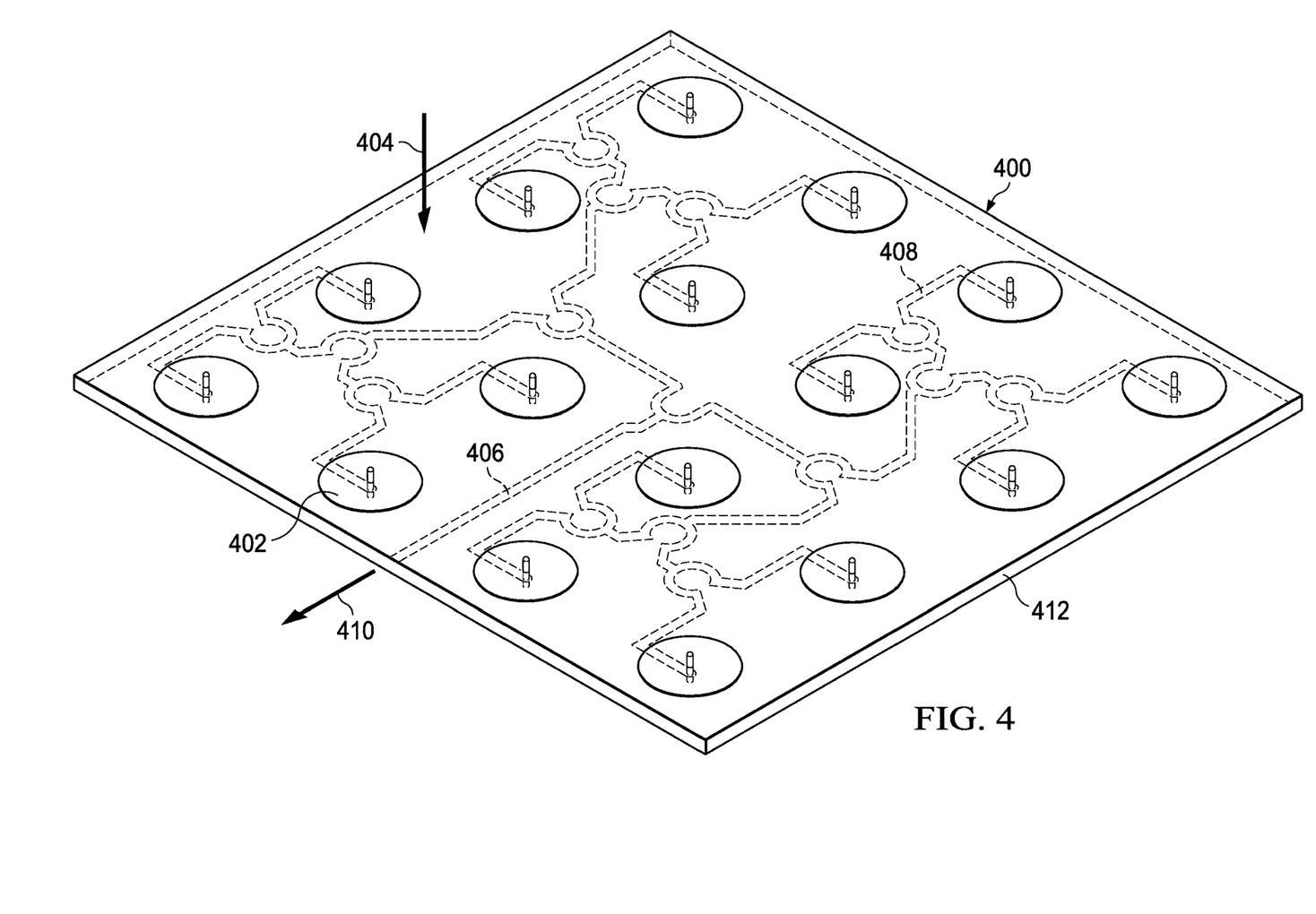
FIG. 4 is a plan view illustration of a receive antenna array in accordance with an illustrative example.

Turning to FIG. 4, a plan view illustration of a receive antenna array is depicted in accordance with an illustrative example. Receive antenna array 400 is an example of one implementation of receive antenna array 160 in radio-frequency identification tag locator 100 in FIG. 1.

In this example, receive antenna array 400 is an X-band antenna comprising a 4×4 array of proximity coupled antenna elements 402 with inclusive slots. A radio frequency signal is received by antenna elements 402 generally from the direction indicated by arrow 404. Embedded microstrip feed network 406, including power divider 408, provides radio frequency power from antenna elements 402 to radio frequency power output 410. Backside ground plane 412 may be provided under the composite radio frequency board. The dimensions of antenna elements 402 with slots may be numerically determined to maximize signal propagation at the desired operating frequency.

Figure 5:
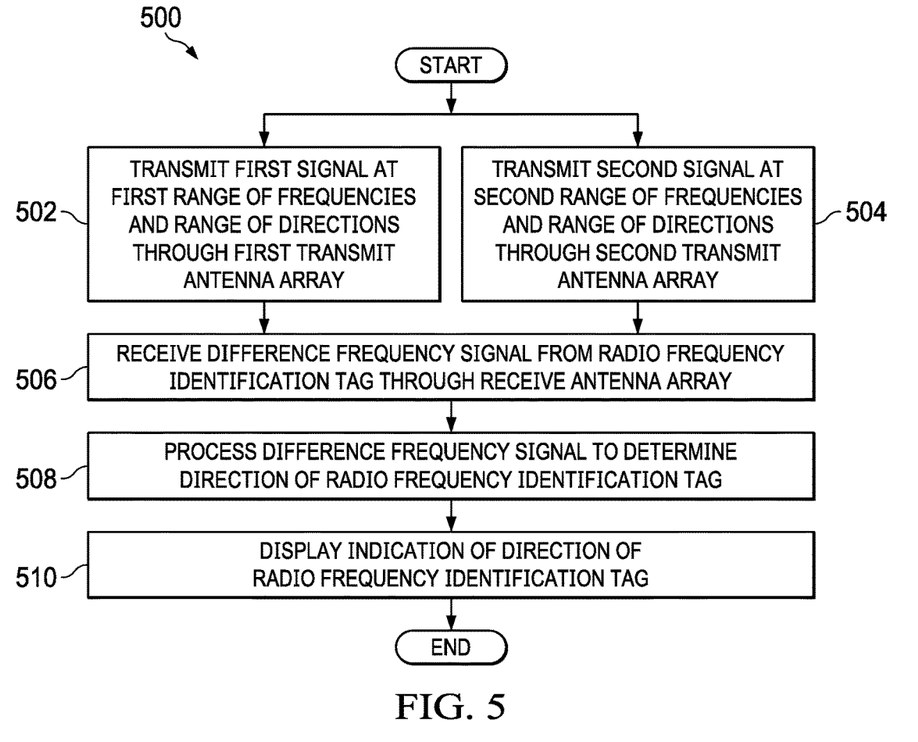
FIG. 5 is an illustration of a flowchart of a process of locating a radio frequency identification tag in accordance with an illustrative example.

Turning to FIG. 5, an illustration of a flowchart of a process of locating a radio frequency identification tag is depicted in accordance with an illustrative example. Process 500 may be implemented, for example, in radio-frequency identification tag locator 100 in FIG. 1.

Process 500 includes simultaneously, and in a coordinated manner, transmitting a first signal at a changing first range of frequencies and directions through a first transmit antenna array (operation 502) and transmitting a second signal at a changing second range of frequencies and directions through a second transmit antenna array (operation 504). A difference frequency signal is received from a radio-frequency identification tag through a receive antenna array (operation 506). The difference frequency signal is processed to determine a direction of the radio-frequency identification tag (operation 508). An indication of the direction of the radio-frequency identification tag then may be displayed (operation 510), with the process terminating thereafter.

Figure 6:
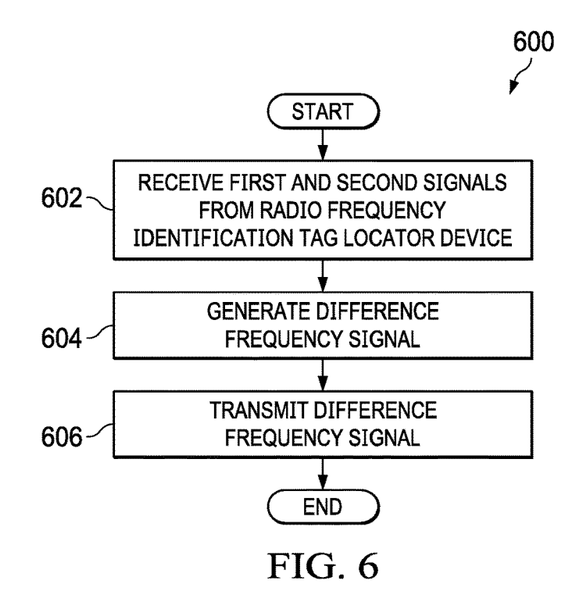
FIG. 6 is an illustration of a flowchart of a process performed by a radio frequency identification tag in accordance with an illustrative example.

Turning to FIG. 6, an illustration of a flowchart of a process performed by a radio-frequency identification tag is depicted in accordance with an illustrative example. Process 600 may be implemented, for example, in radio-frequency identification tag 102 in FIG. 1.

Process 600 may begin with receiving first and second signals from a radio-frequency identification tag locator device (operation 602). A difference frequency signal then may be generated from the received signals (operation 604). The difference frequency signal then may be transmitted back to the radio-frequency identification tag locator device (operation 606), with the process terminating thereafter.

The flowcharts and block diagrams described herein illustrate the architecture, functionality, and operation of possible implementations of systems, methods, and computer program products according to various illustrative examples. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the figures. For example, the functions of two blocks shown in succession may be executed substantially concurrently, or the functions of the blocks may sometimes be executed in the reverse order, depending upon the functionality involved.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other desirable examples. The example or examples selected are chosen and described in order to best explain the principles of the examples, the practical application, and to enable others of ordinary skill in the art to understand the disclosure for various examples with various modifications as are suited to the particular use contemplated.

Clause 1: A method comprising transmitting a first signal, wherein a frequency of the first signal changes through a first plurality of different frequencies and is transmitted in a plurality of different directions corresponding to the first plurality of different frequencies; transmitting a second signal along with the first signal, wherein a frequency of the second signal changes through a second plurality of different frequencies and is transmitted in the plurality of different directions corresponding to the second plurality of different frequencies; receiving a difference frequency signal from a radio frequency identification tag, wherein a frequency of the difference frequency signal is a difference between the frequency of the first signal and the frequency of the second signal; processing the difference frequency signal to determine a direction of the radio frequency identification tag; and displaying an indication of the direction of the radio frequency identification tag.

Clause 2: The method of Clause 1, wherein transmitting the first signal, transmitting the second signal, receiving the difference frequency signal, processing the difference frequency signal, and displaying the indication of the direction of the radio frequency identification tag are performed in a hand-held device.

Clause 3: The method of Clause 1 or 2, wherein the frequency of the first signal and the frequency of the second signal are in a first frequency band ranging from approximately 75 GHz to approximately 110 GHz; and the frequency of the difference frequency signal is in a second frequency band ranging from approximately 7 GHz to approximately 12 GHz.

Clause 4: The method of any of Clauses 1-3, wherein the radio frequency identification tag is attached to a tool.

Clause 5: The method of any of Clauses 1-4, wherein the radio frequency identification tag is attached to an object used on an aircraft.

Clause 6: The method of any of Clauses 1-5, further comprising receiving the first signal and the second signal by the radio frequency identification tag; generating the difference frequency signal from the first signal and the second signal by the radio frequency identification tag; and transmitting the difference frequency signal by the radio frequency identification tag.

Clause 7: An apparatus comprising at least one transmitter configured to transmit a first signal, wherein a frequency of the first signal changes through a first plurality of different frequencies, and wherein the at least one transmitter is configured to transmit the first signal in a plurality of different directions corresponding to the first plurality of different frequencies and transmit a second signal along with the first signal, wherein a frequency of the second signal changes through a second plurality of different frequencies, and wherein the at least one transmitter is configured to transmit the second signal in the plurality of different directions corresponding to the second plurality of different frequencies; a receiver configured to receive a difference frequency signal from a radio frequency identification tag, wherein a frequency of the difference frequency signal is a difference between the frequency of the first signal and the frequency of the second signal; a processor configured to process the difference frequency signal to determine a direction of the radio frequency identification tag; and a display configured to display an indication of the direction of the radio frequency identification tag.

Clause 8: The apparatus of Clause 7, wherein the first signal is transmitted by a first transmitter and the second signal is transmitted by a second transmitter.

Clause 9: The apparatus of Clause 8, wherein the first transmitter, the second transmitter, the receiver, the processor, and the display are implemented in a hand-held device.

Clause 10: The apparatus of any of Clauses 7-9, wherein the frequency of the first signal and the frequency of the second signal are in a first frequency band ranging from approximately 75 GHz to approximately 110 GHz; and the frequency of the difference frequency signal is in a second frequency band ranging from approximately 7 GHz to approximately 12 GHz.

Clause 11: The apparatus of any of Clauses 7-10, wherein each of the at least one transmitter comprises a chirp generator configured to generate a plurality of different frequency signals; an amplifier configured to amplify the plurality of different frequency signals; a frequency multiplier configured to convert the plurality of different frequency signals into radio frequency signals; a radio frequency amplifier configured to amplify the radio frequency signals; and a transmit antenna array configured to transmit the radio frequency signals.

Clause 12: The apparatus of any of Clauses 7-11, wherein the receiver comprises a receive antenna array configured to receive the difference frequency signal; an amplifier configured to amplify the received difference frequency signal; and a power detector configured to provide an output signal that is proportional to the power of the amplified difference frequency signal.

Clause 13: The apparatus of any of Clauses 7-12, further comprising the radio frequency identification tag.

Clause 14: The apparatus of Clause 13, wherein the radio frequency identification tag is attached to at least one of a tool or an object used on an aircraft.

Clause 15: The apparatus of Clause 13 or 14, wherein the radio frequency identification tag comprises a radio frequency identification tag receiver configured to receive the first signal and the second signal; a difference frequency signal generator configured to generate the difference frequency signal from the first signal and the second signal; and a radio frequency identification tag transmitter configured to transmit the difference frequency signal.

Clause 16: A method, comprising receiving a first signal having a first frequency and a second signal having a second frequency by a radio frequency identification tag; generating a difference frequency signal from the first signal and the second signal by the radio frequency identification tag, wherein the difference frequency signal is indicative of a difference between the first frequency of the first signal and the second frequency of the second signal, the difference frequency signal being at a third frequency; and transmitting the difference frequency signal by the radio frequency identification tag.

Clause 17: The method of Clause 16, wherein the first frequency of the first signal and the second frequency of the second signal are in a first frequency band ranging from approximately 75 GHz to approximately 110 GHz; and the third frequency of the difference frequency signal is in a second frequency band ranging from approximately 7 GHz to approximately 12 GHz.

Clause 18: A radio frequency identification tag comprising a radio frequency identification tag receiver configured to receive a first signal at a first frequency and a second signal at a second frequency; a difference frequency signal generator configured to generate a difference frequency signal from the first signal and the second signal, wherein the difference frequency signal is indicative of a difference between the first frequency of the first signal and the second frequency of the second signal; and a radio frequency identification tag transmitter configured to transmit the difference frequency signal.

Clause 19: The radio frequency identification tag of Clause 18, wherein the first frequency of the first signal and the second frequency of the second signal are in a first frequency band ranging from approximately 75 GHz to approximately 110 GHz; and the frequency of the difference frequency signal is in a second frequency band ranging from approximately 7 GHz to approximately 12 GHz.

Clause 20: The radio frequency identification tag of Clause 18 or 19, wherein the radio frequency identification tag is attached to at least one of a tool or an object used on an aircraft.

What is claimed is:

1. A method, comprising:
   transmitting a first signal, wherein a frequency of the first signal changes through a first range of frequencies and is transmitted in a first range of directions corresponding to the first range of frequencies;
   transmitting a second signal along with the first signal, wherein a frequency of the second signal changes through a second range of frequencies and is transmitted in a second range of directions corresponding to the second range of frequencies;
   receiving a difference frequency signal from a radio-frequency identification tag, wherein a frequency of the difference frequency signal is a difference between the frequency of the first signal and the frequency of the second signal;
   processing the difference frequency signal to determine a direction of the radio-frequency identification tag; and
   displaying an indication of the direction of the radio-frequency identification tag.

2. The method of claim 1, wherein transmitting the first signal, transmitting the second signal, receiving the difference frequency signal, processing the difference frequency signal, and displaying the indication of the direction of the radio-frequency identification tag are performed in a hand-held device.

3. The method of claim 1, wherein:
   the frequency of the first signal and the frequency of the second signal are in a first frequency band ranging from approximately 75 GHz to approximately 110 GHz; and
   the frequency of the difference frequency signal is in a second frequency band ranging from approximately 7 GHz to approximately 12 GHz.

4. The method of claim 1, wherein the radio-frequency identification tag is attached to a tool.

5. The method of claim 1, wherein the radio-frequency identification tag is attached to an object used on an aircraft.

6. The method of claim 1, further comprising:
   receiving the first signal and the second signal by the radio-frequency identification tag;
   generating the difference frequency signal from the first signal and the second signal by the radio-frequency identification tag; and
   transmitting the difference frequency signal by the radio-frequency identification tag.

7. The method of claim 1, wherein difference between the frequency of the first signal and the frequency of the second signal is a constant frequency as the first signal and second signal frequencies are changed.

8. The method of claim 1,
wherein, at each direction in the first range of directions of the first signal, the frequency of the first signal changes through each frequency of the first range of frequencies, and
wherein, at each direction in the second range of directions of the second signal, the frequency of the second signal changes through each frequency of the second range of frequencies.

9. An apparatus, comprising:
at least one transmitter configured to transmit a first signal, wherein a frequency of the first signal changes through a first range of frequencies, and wherein the at least one transmitter is configured to transmit the first signal in a first range of directions corresponding to the first range of frequencies, and to transmit a second signal along with the first signal, wherein a frequency of the second signal changes through a second range of frequencies, and wherein the at least one transmitter is configured to transmit the second signal in a second range of directions corresponding to the second range of frequencies;
a receiver configured to receive a difference frequency signal from a radio-frequency identification tag, wherein a frequency of the difference frequency signal is a difference between the frequency of the first signal and the frequency of the second signal;
a processor configured to process the difference frequency signal to determine a direction of the radio-frequency identification tag; and
a display configured to display an indication of the direction of the radio-frequency identification tag.

10. The apparatus of claim 9, wherein the first signal is transmitted by a first transmitter and the second signal is transmitted by a second transmitter.

11. The apparatus of claim 10, wherein the first transmitter, the second transmitter, the receiver, the processor, and the display are implemented in a hand-held device.

12. The apparatus of claim 9, wherein:
the frequency of the first signal and the frequency of the second signal are in a first frequency band ranging from approximately 75 GHz to approximately 110 GHz; and
the frequency of the difference frequency signal is in a second frequency band ranging from approximately 7 GHz to approximately 12 GHz.

13. The apparatus of claim 9, wherein the at least one transmitter comprises:
a chirp generator configured to generate a plurality of different frequency signals;
an amplifier configured to amplify the plurality of different frequency signals;
a frequency multiplier configured to convert the plurality of different frequency signals into radio frequency signals;
a radio frequency amplifier configured to amplify the radio frequency signals; and
a transmit antenna array configured to transmit the radio frequency signals.

14. The apparatus of claim 9, wherein the receiver comprises:
a receive antenna array configured to receive the difference frequency signal;
an amplifier configured to amplify the received difference frequency signal to generate an amplified difference frequency signal; and
a power detector configured to provide an output signal that is proportional to a power of the amplified difference frequency signal.

15. The apparatus of claim 9, further comprising the radio-frequency identification tag.

16. The apparatus of claim 15, wherein the radio-frequency identification tag is attached to a tool.

17. The apparatus of claim 15, wherein the radio-frequency identification tag comprises:
a radio-frequency identification tag receiver configured to receive the first signal and the second signal;
a difference frequency signal generator configured to generate the difference frequency signal from the first signal and the second signal; and
a radio-frequency identification tag transmitter configured to transmit the difference frequency signal.

18. The apparatus of claim 9, wherein difference between the frequency of the first signal and the frequency of the second signal is a constant frequency as the first signal and second signal frequencies are changed.

19. The apparatus of claim 9,
wherein, at each direction in the first range of directions of the first signal, the frequency of the first signal changes through each frequency of the first range of frequencies, and
wherein, at each direction in the second range of directions of the second signal, the frequency of the second signal changes through each frequency of the second range of frequencies.

20. A method, comprising:
receiving, by a radio-frequency identification tag, a first signal having a first frequency from a first direction and a second signal having a second frequency from a second direction;
generating a difference frequency signal from the first signal and the second signal by the radio-frequency identification tag, wherein the difference frequency signal is indicative of a difference between the first frequency of the first signal and the second frequency of the second signal, the difference frequency signal being at a third frequency; and
transmitting the difference frequency signal by the radio-frequency identification tag.

21. The method of claim 20, wherein:
the first frequency of the first signal and the second frequency of the second signal are in a first frequency band ranging from approximately 75 GHz to approximately 110 GHz; and
the third frequency of the difference frequency signal is in a second frequency band ranging from approximately 7 GHz to approximately 12 GHz.

22. A radio-frequency identification tag, comprising:
a radio-frequency identification tag receiver configured to receive a first signal at a first frequency from a first direction and a second signal at a second frequency from a second direction;
a difference frequency signal generator configured to generate a difference frequency signal from the first signal and the second signal, wherein the difference frequency signal is indicative of a difference between the first frequency of the first signal and the second frequency of the second signal; and
a radio-frequency identification tag transmitter configured to transmit the difference frequency signal.

23. The radio-frequency identification tag of claim 22, wherein:
   the first frequency of the first signal and the second frequency of the second signal are in a first frequency band ranging from approximately 75 GHz to approximately 110 GHz; and
   a frequency of the difference frequency signal is in a second frequency band ranging from approximately 7 GHz to approximately 12 GHz.

24. The radio-frequency identification tag of claim 22, wherein the radio-frequency identification tag is attached to at least one of a tool or an object used on an aircraft.

\* \* \* \* \*